United States Patent [19]
Kuwahara

[11] Patent Number: 5,535,672
[45] Date of Patent: Jul. 16, 1996

[54] LASER PLATE MAKING METHOD AND PRESS PLATE MADE THEREBY

[75] Inventor: Soichi Kuwahara, Kanagawa, Japan

[73] Assignee: Sony Corporation, Tokyo, Japan

[21] Appl. No.: 314,841

[22] Filed: Sep. 29, 1994

[30] Foreign Application Priority Data

Sep. 30, 1993 [JP] Japan ................... 5-245454

[51] Int. Cl.$^6$ ................................... B41N 1/06
[52] U.S. Cl. ................ 101/170; 101/395; 101/401.1; 347/232; 347/251
[58] Field of Search .............. 101/128.21, 128.4, 101/150, 170, 395, 401.1, 467; 358/298, 299, 454; 347/232, 251

[56] References Cited

U.S. PATENT DOCUMENTS

| | | | |
|---|---|---|---|
| 5,055,923 | 10/1991 | Kitagawa et al. | 101/401.1 |
| 5,155,599 | 10/1992 | Delabastita | 358/298 |
| 5,213,034 | 5/1993 | Kuwahara et al. | 101/395 |
| 5,355,793 | 10/1994 | Sato et al. | 101/401.1 |

FOREIGN PATENT DOCUMENTS 2030929  4/1980  United Kingdom ............... 101/401.1

*Primary Examiner*—Stephen Funk
*Attorney, Agent, or Firm*—Pasquale Musacchio; Jerry A. Miller

[57] ABSTRACT

To provide a laser plate making apparatus having a simple construction capable of reducing generation of Moiré. The slant line R1 formed of the starting position of the formed arbitrary recess 7 which is formed on the press plate 5a or the like in the main scanning direction F is formed so as not to be coincident with the slant line R2 formed of the starting position in the main scanning direction F of the recess 7 which is located at the next position in the sub scanning direction A. Therefore, when a multicolor printing is carried out by using the press plate 5Pa thus formed or the like, manifestation of Moiré is reduced. Particularly, when the line R3 connecting the predetermined point within the arbitrary recess 7 to the point located at the position corresponding to the predetermined point in the recess 7 which is located at adjacent position in the sub scanning direction A, is set to a constant angle φ different from the irradiation angle θ of the laser beam, the Moiré is further reduced.

11 Claims, 8 Drawing Sheets

LASER PLATE MAKING METHOD AND PRESS PLATE MADE THEREBY

The disclosure of a related application Ser. No. 08/310,118, filed on Sep. 21, 1994, entitled Laser Plate Making Apparatus, Attorney Docket No. 50H1067, and assigned to Sony Corporation wherein the inventors are Tatsumi Ito and Soichi Kuwahara is hereby incorporated by reference.

BACKGROUND

1. Field of the Invention

This invention relates to a laser plate making apparatus for making a press plate for a gravure printing press and the press plate made by the laser plate making apparatus.

2. Background of the Invention

FIG. 7 schematically shows a construction of a laser scanning and optical system of a general laser plate making apparatus. In the apparatus shown in FIG. 7, a laser block 4 typically includes a semiconductor laser 1, a collimator lens 2 and an objective lens 3. In opposing relation to the laser block 4, there is disposed a plate cylinder 6 around an outer surface of which a form plate sheet 5 is wound. Then, a laser light emitted from the semiconductor laser 1 is made into a parallel light by the collimator lens 2, and then it is converged by the objective lens 3 and incident upon the form plate sheet 5 on the plate cylinder 6 as a laser beam L.

In this case, for example, the laser beam L controlled in its on/off state is irradiated on the form plate sheet 5 while the plate cylinder 6 around which the form plate sheet 5 is wound is rotated at a constant rate in the direction of arrow E (the opposite direction to a main scanning direction F of the laser beam L), whereby a recess (hereinafter referred to as a dot upon necessity) 7 corresponding to image information is formed on the form plate sheet 5.

After the recesses 7 are formed on one line in the main scanning direction F, the laser block 4 is fed in a step feeding manner by an amount of one line in the direction of arrow A (sub scanning direction) which is the axial direction of the plate cylinder 6 by a feeding mechanism not shown, so that the recesses 7 are formed on a new line.

FIG. 8A shows an example of a recess of a fundamental shape (hereinafter referred to as a fundamental recess or simply, recess upon necessity) 7A of the recess 7. That is, the fundamental recess 7A of the recess 7 has a substantially rectangular shape corresponding to a beam profile of the laser beam L converged on the form plate sheet 5 by the objective lens 3. Its shape is, for example, such that its length dH is dH=120 μmm and its width dV is dV=0.6 μmm. Further, if the direction of the length dH of the recess 7 formed on the form plate sheet 5 is a direction parallel to the axial direction of the plate cylinder 6, the recess 7 is one formed under the condition that the irradiation angle θ of the laser beam L is θ=0° (horizontal direction).

Then, the form plate sheet 5 is rotated in the direction of arrow E, during which if the semiconductor laser 1 is in on-state there are formed recesses 7B, 7C or the like in which the width dV shown in FIG. 8A is elongated as shown in FIG. 8B and FIG. 8C by a time corresponding to the duration of the on-time.

Finally, the form plate sheet 5 has formed thereon image information formed of halftone dots differing in areas by the recesses 7. In addition, if gradation is further increased, the amount of radiation of the laser beam L may be increased or decreased to control the depth of the recesses 7.

Then, when the recesses 7 are sequentially formed all over the main scanning lines, a plane scanning relative to the form plate sheet 5 is finished and a press plate 5P (the form plate sheet 5 on which the plane scanning is finished) is completed.

If a plurality of, for example, four press plates 5P thus manufactured are utilized to carry out a multicolor printing of four color printing or the like such as of C (cyan) color, M (magenta) color, Y (yellow) color and K (black) color, four press plates 5P for respective colors are manufactured and the four press plates 5P are loaded on a press machine. Then, an ink of each color is coated on the press plate 5P for each color, one sheet of paper as a printed material is sequentially pressed against each press plate 5P of which recesses 7 are filled with ink, and the ink is transferred to the sheet of paper overlaid thereon, whereby a printed material of a multicolor printing (hard copy) is produced.

Additionally, if the multicolor printing is carried out by using the press plate 5P having formed thereby an image information formed of the halftone dots by recesses 7 which are formed of a single kind of fundamental recesses 7A, undesirable stripe patterns of shading having various shapes known as Moiré are formed.

As a technology for suppressing the Moiré from being caused, the present applicant has proposed a technology which was published in Japanese Patent publication gazette No. 4-67950.

FIG. 9 shows a mechanical construction of the laser block 4 which is used for implementing the technology and has been published in the above publication gazette.

In the laser block 4, a laser holder supporting box 18 is fixed to a laser head mounting stage 11 having a substantially T-letter shape and also a plate 12 is fixed thereto. Then, a stepping motor 13 is fixed to the plate 12. The stepping motor 13 has mounted on its rotary shaft a first gear which does not appear in the figure for purposes of clarity.

The first gear is meshed with a second gear 14. A semiconductor laser 1 is fixed coaxially and integrally with the shaft of the second gear 14 through a semiconductor laser holder 15. In addition, a laser holder, a collimator lens, though not shown, and an objective lens holder 16, an objective lens 3 are fixed coaxially and integrally with the shaft of the second gear 14 in an emitting direction of the semiconductor laser 1, or the optical axis direction.

In the above construction, the second gear 14 can be rotated in the direction of arrow G or the direction of arrow H by driving the stepping motor 13 through the above first gear. When the semiconductor laser 1 is rotated by the rotation of the second gear 14, an irradiation angle θ of the laser beam L can be changed and a dot pattern as a countermeasure against Moiré can be formed on the press plate 5P.

FIG. 10A to FIG. 10F show examples of dot patterns as a countermeasure against Moiré which are formed on the press plate 5P by using the laser block 4 of the example in FIG. 9.

FIG. 10E is an example of a press plate $5P_o$ in which the recesses 7 are formed at an irradiation angle of θ=0°.

FIG. 10F is an example of a press plate $5P_{ow}$ in which a distance "a" in the sub scanning direction A between the adjacent recesses 7 formed at the irradiation angle of θ=0° is widened as compared with the example in FIG. 10E.

FIG. 10A shows an example of a press plate $5P_{-30}$ under the condition that the semiconductor laser 1 is rotated by 30° in the counterclockwise direction (in terms of notation, it is referred to as −30°) with respect to the sub scanning direction A so as to make the irradiation angle θ, θ=−30°.

Similarly, FIG. 10B shows a press plate $5P_{30}$ formed under the condition that the semiconductor laser 1 is rotated by θ=30° in the clockwise direction with respect to the sub scanning direction A, FIG. 10C shows a press plate $5P_{60}$ formed under the condition that it is rotated by θ=60° in the counterclockwise direction with respect to the sub scanning direction A, and FIG. 10D shows a press plate $5P_{60}$ formed under the condition that it is rotated by θ=−60° in the clockwise direction with respect to the sub scanning direction A, respectively.

Of the plurality of press plates 5P thus manufactured, for example, the press plate $5P_{-30}$ (FIG. 10A) is used for a C-color plate, the press plate $5P_{30}$ (FIG. 10B) is used for a M-color plate, and the press plate $5P_{OW}$ (FIG. 10F) is used for a Y-color plate and a K-color plate and then multicolor printing is carried out. As a result, Moiré is suppressed to be almost not conspicuous on the produced printed material.

In this prior art, it should be noted that in each of the dot patterns shown in FIG. 10A to FIG. 10F, a slant line R formed of the starting position of the arbitrary recess 7a in the main scanning direction F is coincident with a slant line R formed of the starting position in the main scanning direction F of the recess 7b adjacent to that recess in the sub scanning direction A. It is noted that in the description of the specification or the drawings, the slant line R also includes a case of the irradiation angle θ=0°, as shown in FIG. 10E.

However, according to this prior art, the rotation mechanism of the laser block 4 of the example in FIG. 9 for changing the irradiation angle θ of the semiconductor laser 1 is complicated and the apparatus itself becomes expensive. In addition, if the central axis of the rotary mechanism is not accurately coincident with the optical axis of the optical system, blur or the like is caused upon overlaying the colors, which undesirably degrades the quality of the picture printed and formed on the printed material.

This invention is made in consideration of the above problem with an object to provide a laser plate making apparatus having a simple construction capable of reducing the manifestation of Moiré.

SUMMARY OF THE INVENTION

According to the plate making apparatus of the invention, as, for example, shown in FIG. 1 and FIGS. 6A–6D, in a laser plate making apparatus for manufacturing a press plate 5Pa (FIG. 6A) by irradiating a laser beam onto a form plate sheet 5 which is wound around a rotating plate cylinder 6 and forming a dot pattern made of recesses 7 on the form plate sheet 5, when a press plate 5Pb (FIG. 6B) for a different color is manufactured by using a new form plate sheet 5, a position at which the laser beam is irradiated is controlled while the irradiation angle θ of the laser beam onto the form plate sheet 5 is fixed, thereby to form a dot pattern as a countermeasure against Moiré.

According to the press plate of the invention, in a press plate 5P of a form plate sheet 5 on which a dot pattern made of recesses are formed by irradiating a laser beam on the form plate sheet 5 which is wound around a rotating plate cylinder 6 in the main scanning direction F, and by shifting sequentially the laser beam at every one rotation of the plate cylinder 6 in the sub scanning direction A, a slant line $R_1$ formed of a starting position of the formed arbitrary recesses 7 in the main scanning direction F is formed so as not to coincident with a slant line $R_2$ formed of a starting position in the main scanning direction F of recesses 7 located at the next position in the sub scanning direction A.

Further, according to the press plate of the present invention, angles of the slant lines $R_1$, $R_2$ formed of the starting positions of the formed arbitrary recesses 7 in the main scanning direction F are coincident with an irradiation angle θ of the laser beam, and a line $R_3$ connecting a predetermined point within the arbitrary recess 7 to a point located at a position corresponding to the predetermined point in the recess 7 which is located at the next position in the sub scanning direction A, is set to a constant angle φ different from the irradiation angle θ of the laser beam.

According to the plate making apparatus of the invention, when the press plate 5P for a different color is manufactured by using a new form plate sheet 5, control is made on a position at which the laser beam is irradiated while the irradiation angle θ of the laser beam onto the form plate sheet 5 is fixed, thereby to form a dot pattern as a countermeasure against Moiré. Therefore, a dot pattern as a countermeasure against Moiré can be formed without changing the irradiation angle θ of the laser beam.

According to the press plate of the invention, the slant line $R_1$ formed of a starting position of the formed arbitrary recess 7 in the main scanning direction F is formed so as not to be coincident with the slant line $R_2$ formed of the starting positions in the main scanning direction of a recess 7 located at the next position in the sub scanning direction A. Therefore, when a multicolor printing is carried out by using the press plate 5P thus formed, manifestation of Moiré is reduced. Particularly, when the line $R_3$ connecting the predetermined point within the arbitrary recess 7 to the point located at a position corresponding to the predetermined point in the recess 7 which is located at the next position in the sub scanning direction A, is set to the constant angle φ different from the irradiation angle θ of the laser beam, the Moiré is further reduced.

DETAILED DESCRIPTION OF THE INVENTION

Figure 1:
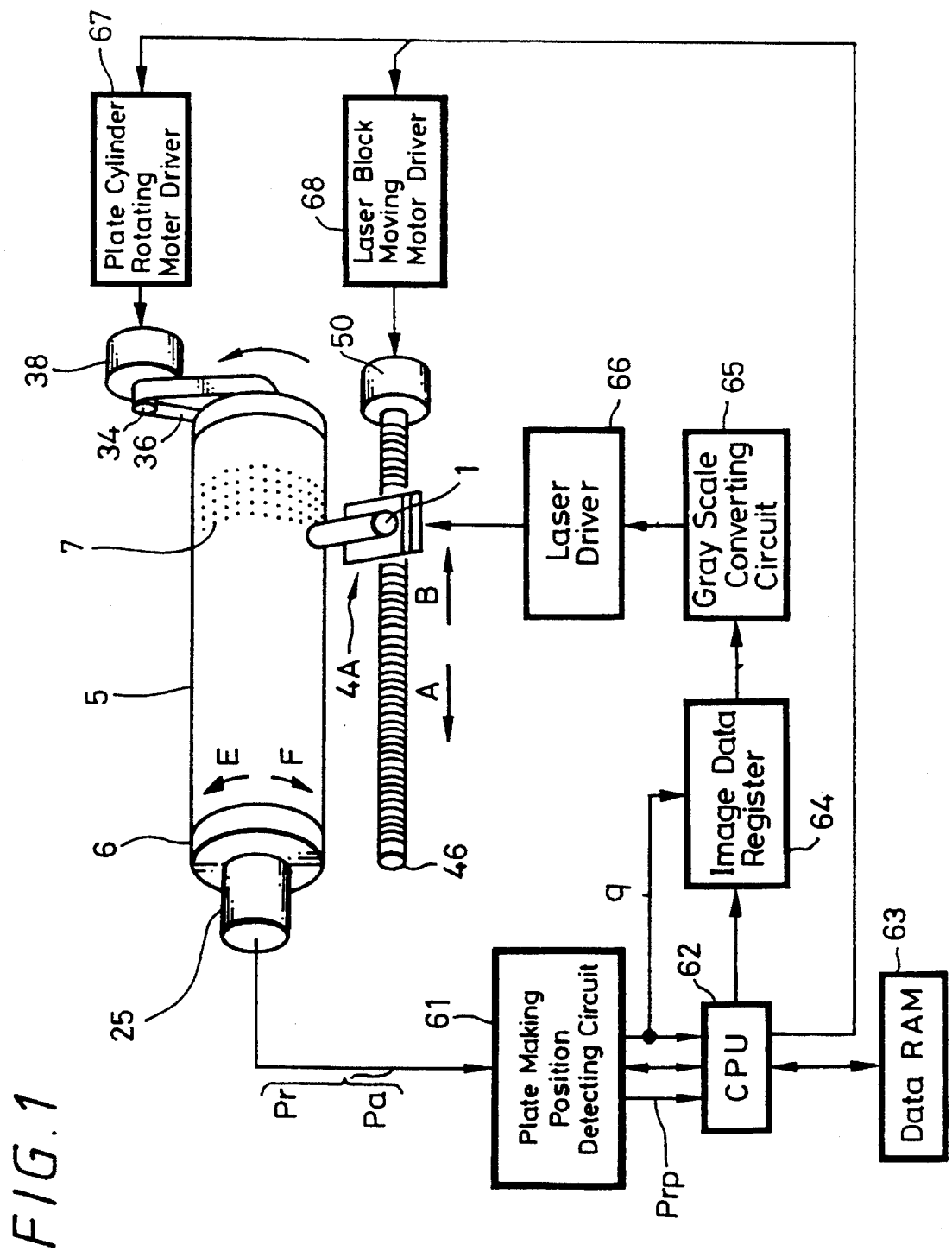
FIG. 1 is a schematic diagram showing a construction of one embodiment of the laser plate making apparatus according to the invention.

The laser plate making apparatus of the present invention will hereinafter be described with reference to the drawings wherein like elements are referenced by like reference numerals.

Figure 2:
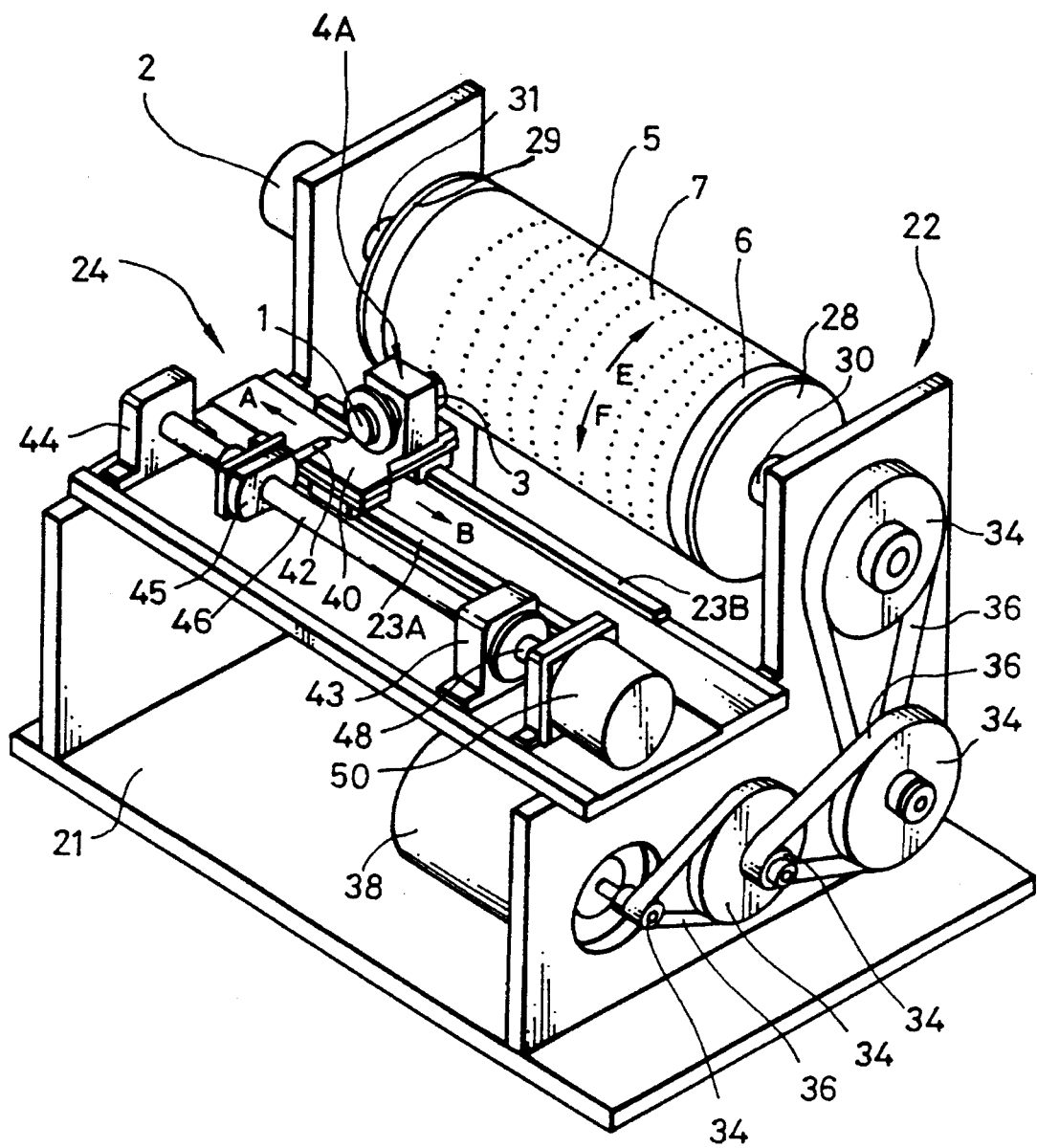
FIG. 2 is a perspective view of the construction of a mechanical system of the laser plate making apparatus of the example in FIG. 1.

FIG. 2 shows a mechanical construction of the laser plate making apparatus of the embodiment. The apparatus includes a base 21 having a plate cylinder rotating unit 22 and a laser block moving unit 24.

The apparatus further includes a laser block 4A having a laser beam emitting device which includes a laser diode such as a semiconductor laser, and an objective lens or the like which are integrally assembled. The laser block 4A is capable of moving along guide rails 23A, 23B in the direction of arrows A, B, or the axial direction of the plate cylinder 6.

The plate cylinder 6 is a cylinder made of metal. A form plate sheet 5 is wound around and fixed to the side surface of the plate cylinder 6. Caps 28, 29 made of metal are fixed to opposite ends of the plate cylinder 6, respectively. The caps 28, 29 include first 30 and second 31 shafts, respectively, projecting in the axial direction of the plate cylinder 6.

The second shaft 31 is coupled with a rotary encoder 25. The first shaft 30 is coupled to a plate cylinder rotating motor 38 through five pulleys 34 and three belts 36. When the plate cylinder rotating motor 38 is rotated, the plate cylinder 6 around which the form plate sheet 5 is wound is rotated in the direction of arrow E or the direction of arrow F (the main scanning direction of the laser beam) which is opposite to the former.

A laser head mounting stage 40 which includes the laser block moving unit 24 is fixed to a moving member 45 through an arm 42. The moving member 45 is meshed with a ball screw 46 disposed between bearings 43 and 44. The ball screw 46 is connected to a laser block moving motor 50 through the bearing 43 and a shaft joint 48.

Thus, when the motor 50 rotates, the moving member 45 is moved in the direction of arrow A or the direction of arrow B, so that the laser block 4A integrally mounted on the moving member 45 through the arm 42 and the laser block mounting stage 40 is moved in the direction of arrow A or the direction of arrow B along the guide rails 23A, 23B.

When the plate making is carried out on the form plate sheet 5, the laser block 4A is first moved to the end portion in the direction of arrow B. Then, the semiconductor laser 1, which may be a laser diode, is controlled in its on/off state and intensity of light while the plate cylinder 6 is rotated in the direction of arrow E (in the opposite direction to the main scanning direction of the laser beam (direction of arrow F)), so that a halftone dot image made of recesses is formed on the form plate sheet 5 by means of the laser beam that is irradiated onto the form plate sheet 5 by way of the objective lens 3 in the laser block 4A. When scanning of one line amount in the main scanning is completed, the laser block 4A is moved in a step feeding manner in the direction of arrow A (sub scanning direction). Thus, a press plate 5P on which an image is formed on the entire surface of the form plate sheet 5 can be manufactured.

Figure 3:
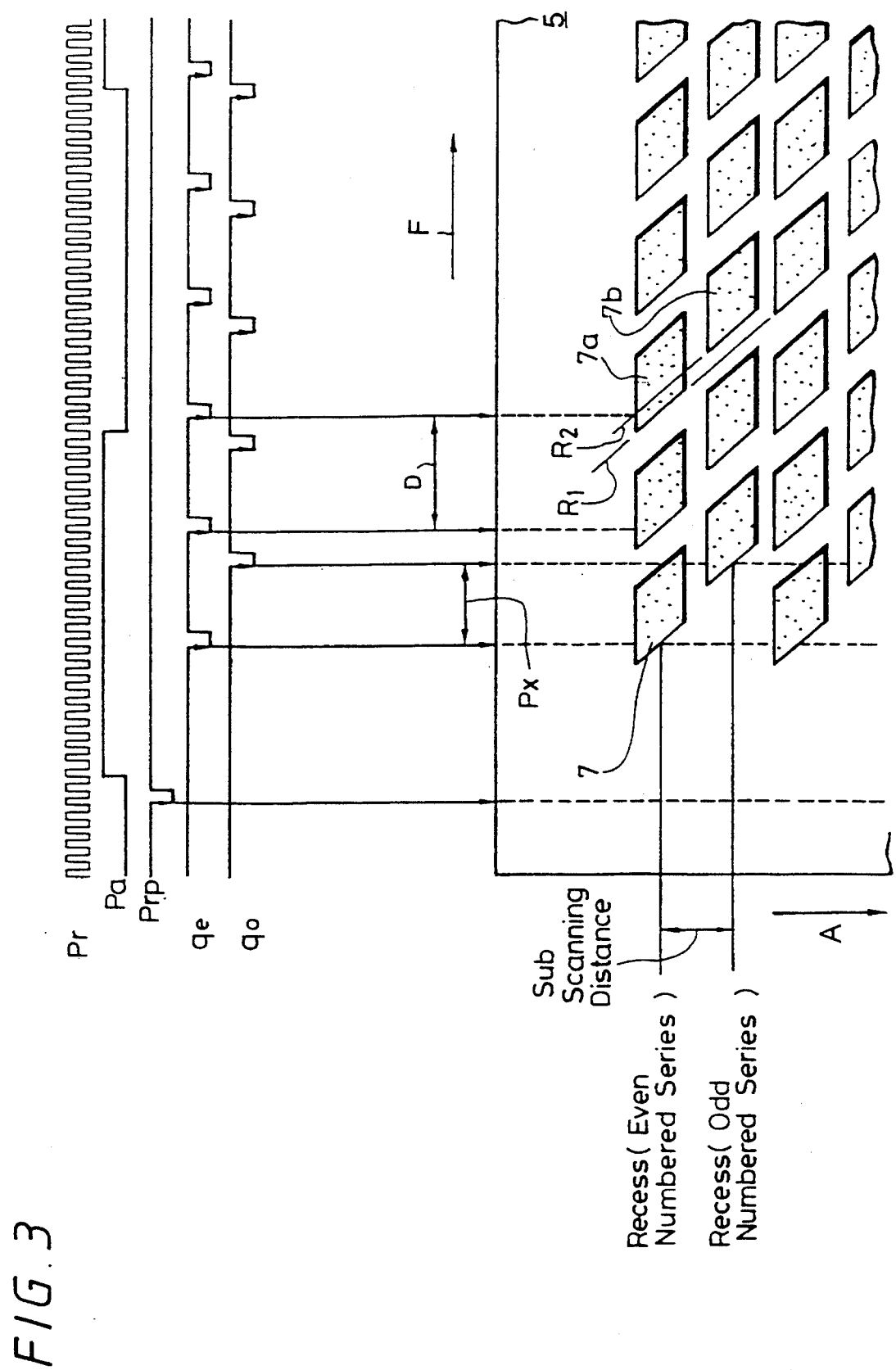
FIG. 3 is a schematic diagram showing a relation between a plate making pattern and a plate making timing signal.

FIG. 1 schematically illustrates the construction shown in FIG. 2. FIG. 3 is a schematic diagram including a timing chart for explaining the operation of the example in FIG. 1. The operation of the example shown in FIG. 1 will be described below with reference to FIG. 3.

From the rotary encoder 25 mounted on the plate cylinder 6, there are generated at every one rotation of the plate cylinder 6, a reference pulse Pr comprising, in this example, 216 pulses and an absolute position signal Pa indicating an absolute position in the circumferential direction of the plate cylinder 6. These are supplied to a plate making position detecting circuit 61 which includes a comparing circuit and a counter or the like (not shown).

The plate making position detecting circuit 61 generates a reference position signal Prp and a plate making timing signal q from the absolute position signal Pa and the reference pulse Pr. Furthermore, the plate making timing signal q includes a plate making timing signal $q_e$ for even numbered series and a plate making timing signal $q_o$ for odd numbered series as shown in FIG. 3. These signals are supplied to a CPU 62 and an image data register 64.

In this case, the plate making position detecting circuit 61 compares the absolute position signal Pa with an absolute position set value which is set in advance in a dip switch or the like of 16 bits (not shown), generates the reference position signal Prp corresponding to a rotational position of the plate cylinder 6 at which they are coincident with each other, and supplies the same to the CPU 62 as an interrupt input.

Further, after the 16-bits counter, (not shown), in the plate making position detecting circuit 61 is reset by the reference position signal Prp, the 16-bits counter starts to increment its count in response to the reference pulse Pr.

Then, when a value of pulse number of the reference pulse Pr representing the plate making start position which is set in the plate making start position set register (not shown) by the CPU 62, is coincident with a count value of the above 16-bits counter (not shown), the plate making timing signal q corresponding to the plate making start position (see FIG. 3) is generated.

Image data are read out from a data RAM 63 under the operation of the CPU 62 at a timing when the plate making timing signal q is obtained, and then the data are written into the image data register 64. The data RAM 63 has stored in advance image data taken in by an image scanner or the like.

Then, at the next plate making timing, the semiconductor laser 1 is driven in accordance with the image data read out from the image data register 64 so that the recesses 7 are formed on the form plate sheet 5. In addition, the image data read out from the image data register 64 are converted into an amount of laser irradiation time by a gray scale converting circuit 65, and then supplied through a laser driver 66 to the semiconductor laser 1.

Further, the CPU 62 supplies a positive rotation pulse or a negative rotation pulse to a plate cylinder rotating motor driver 67 on the basis of a status signal (not shown), so as to control the rotation of the plate cylinder rotating motor 38. Further, the CPU 62 supplies the positive rotation pulse or the negative rotation pulse to a laser block moving motor driver 68 on the basis of the absolute position signal Pa or the like supplied from the plate making position detecting circuit 61, so as to control the rotation of the laser block moving motor 50, thereby controlling the motion of the laser block 4A in the sub scanning direction A or the direction B opposite thereto.

FIG. 3 shows a relation between the plate making timing signal q and the plate making dot pattern which is formed on the form plate sheet 5 by the semiconductor laser 1 under the above control.

In the form plate sheet 5, the main scanning direction F of the laser beam is the opposite direction to the rotation direction E of the plate cylinder 6, and the sub scanning direction A of the laser beam L is equivalent to the axial direction of the plate cylinder 6.

A position corresponding to a timing point when the reference position signal Prp formed on the basis of the absolute position signal Pa is obtained, is the plate making start reference position relative to the form plate sheet 5. A plate making distance D between recesses (dots) 7 in the main scanning direction F is constant.

As shown in FIG. 3, in order to shift the plate making start position of the line of even series relative to that of the odd series of the recesses 7 by a predetermined pitch Px, a set value of the plate making start position set register (not shown) may be reset in accordance with the access from the CPU 62 at every time the plate making for foregoing one line amount is completed. According to this operation, the plate making timing signal qe for the even numbered series and the plate making timing signal qo for the odd numbered series can be produced as shown in FIG. 3, and thus the predetermined deviation of pitch Px can be made.

Figure 4:
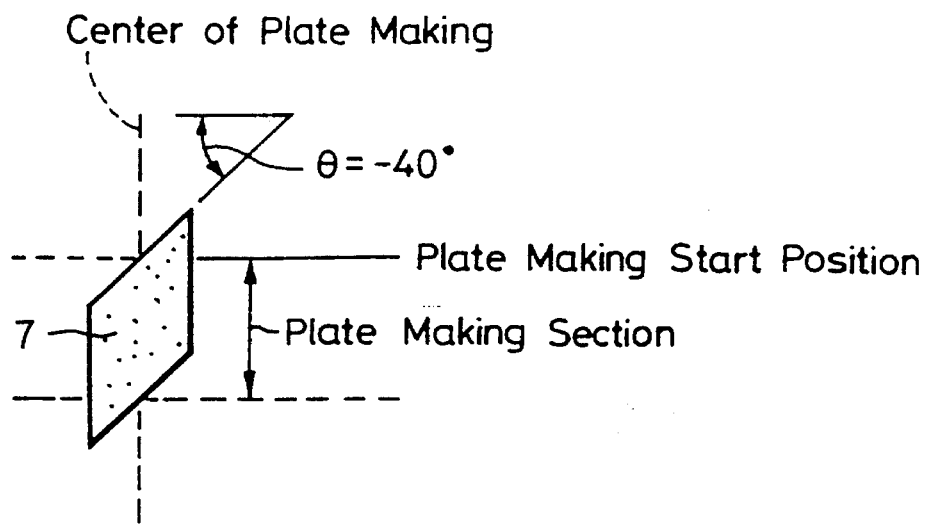
FIG. 4 is a schematic diagram representing an example of one recess.

FIG. 4 shows an example of one recess 7 of recesses 7 that are formed on the form plate sheet 5. In this example, the laser beam is irradiated while it is tilted by 40° in the counterclockwise direction relative to the horizontal direction. That is, the irradiation angle $\theta$ of the semiconductor laser 1 is $\theta = -40°$.

In the dot pattern formed on the form plate sheet 5 in FIG. 3, it should be noted that the slant line R1 formed of a starting position of the formed arbitrary recess 7 in the main scanning direction F is formed so as not to be coincident with the slant line R2 formed of a starting position in the main scanning direction F of a recess 7 which is located at the next position in the sub scanning direction A. As described below, this arrangement is made to reduce Moiré without mechanical rotation of the laser block 4A around the optical axis.

Figure 5:
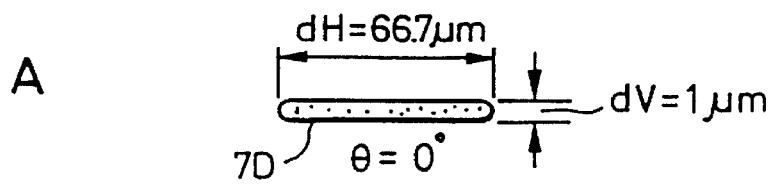
FIG. 5A is a schematic diagram showing a fundamental pattern of a recess when the irradiation angle is 0°.
FIG. 5B is a schematic diagram showing a fundamental pattern of a recess when the irradiation angle is 40°.
Figure 5:
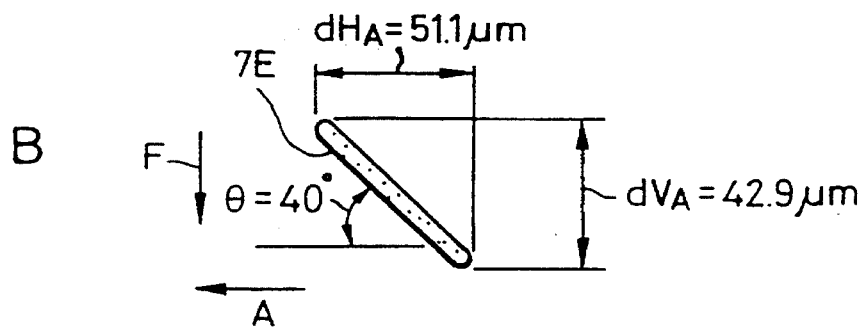

FIG. 5A and FIG. 5B show fundamental recesses 7D, 7E having shapes corresponding to beam profiles which are produced when the laser beam is emitted from the laser block 4A and incident on the form plate sheet 5 to be formed thereon at an irradiation angle of $\theta = 0°$ and an irradiation angle of $\theta = 40°$, respectively.

Figure 6:
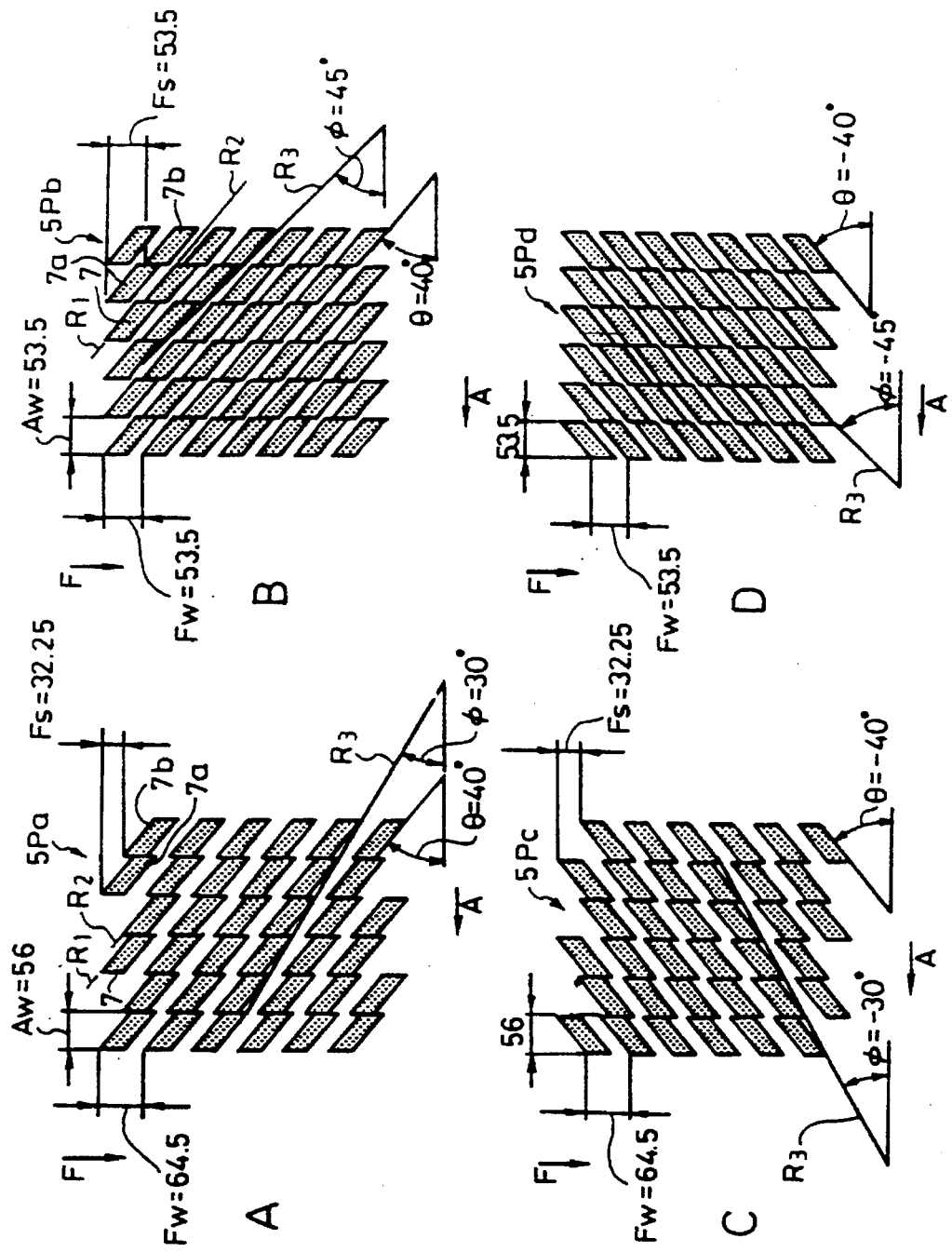
FIG. 6A is a schematic diagram showing one example of a dot pattern formed on a press plate.
FIG. 6B is a schematic diagram showing another example of a dot pattern formed on the press plate.
FIG. 6C is a schematic diagram showing still another example of a dot pattern formed on the press plate.
FIG. 6D is a schematic diagram showing still another example of a dot pattern formed on the press plate.
Figure 7:
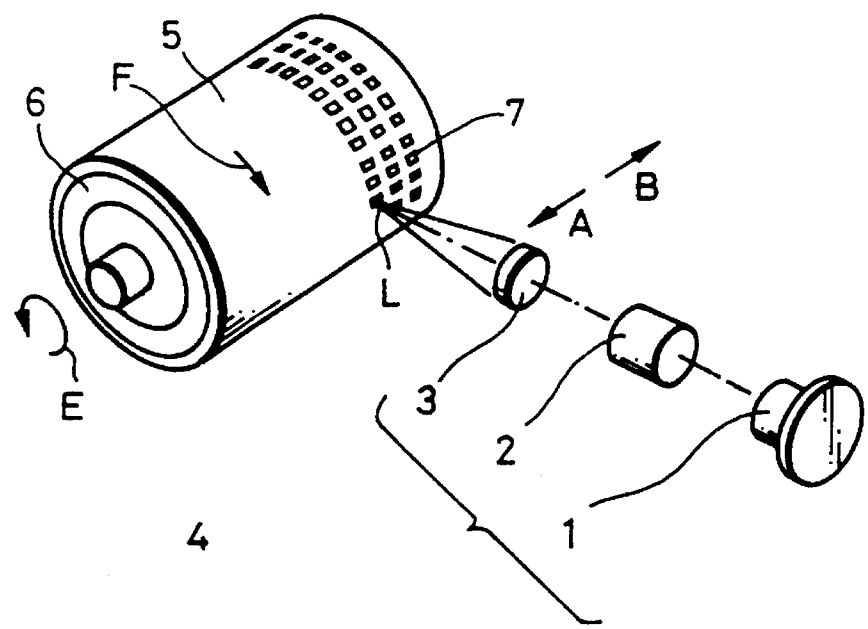
FIG. 7 is a perspective view of a construction of a prior art laser scanning and optical system.
Figure 8:
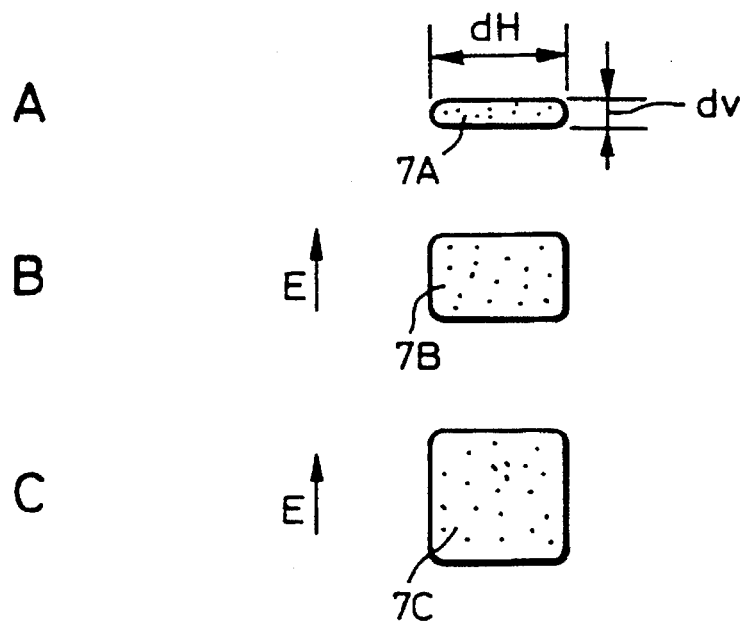
FIG. 8A is a diagram showing a fundamental pattern of a prior art recess formed on the press plate.
FIG. 8B is a schematic diagram showing an example of a prior art recess formed on the press plate.
FIG. 8C is a schematic diagram showing another example of a prior art recess formed on the press plate.
Figure 9:
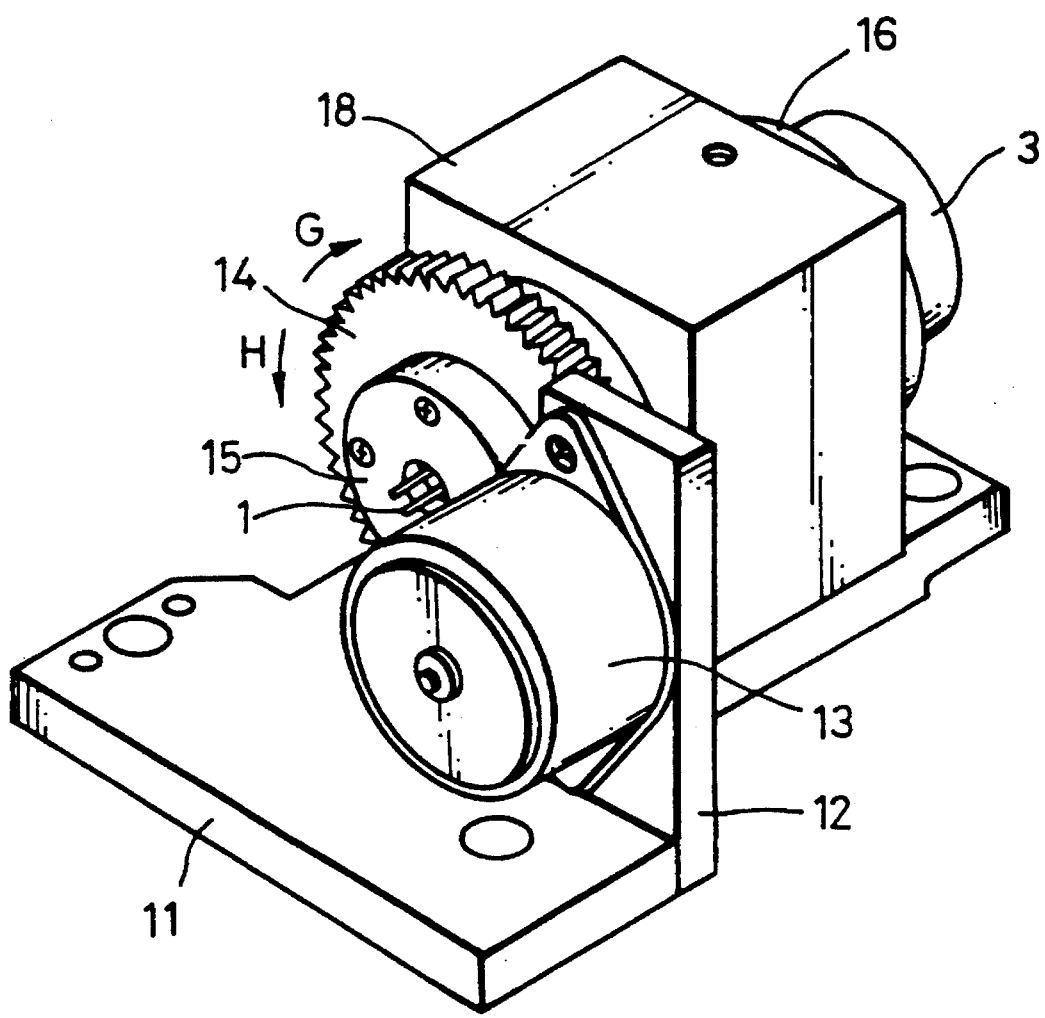
FIG. 9 is a perspective view of a construction of a prior art laser block which is assembled into a conventional laser plate making apparatus.
Figure 10:
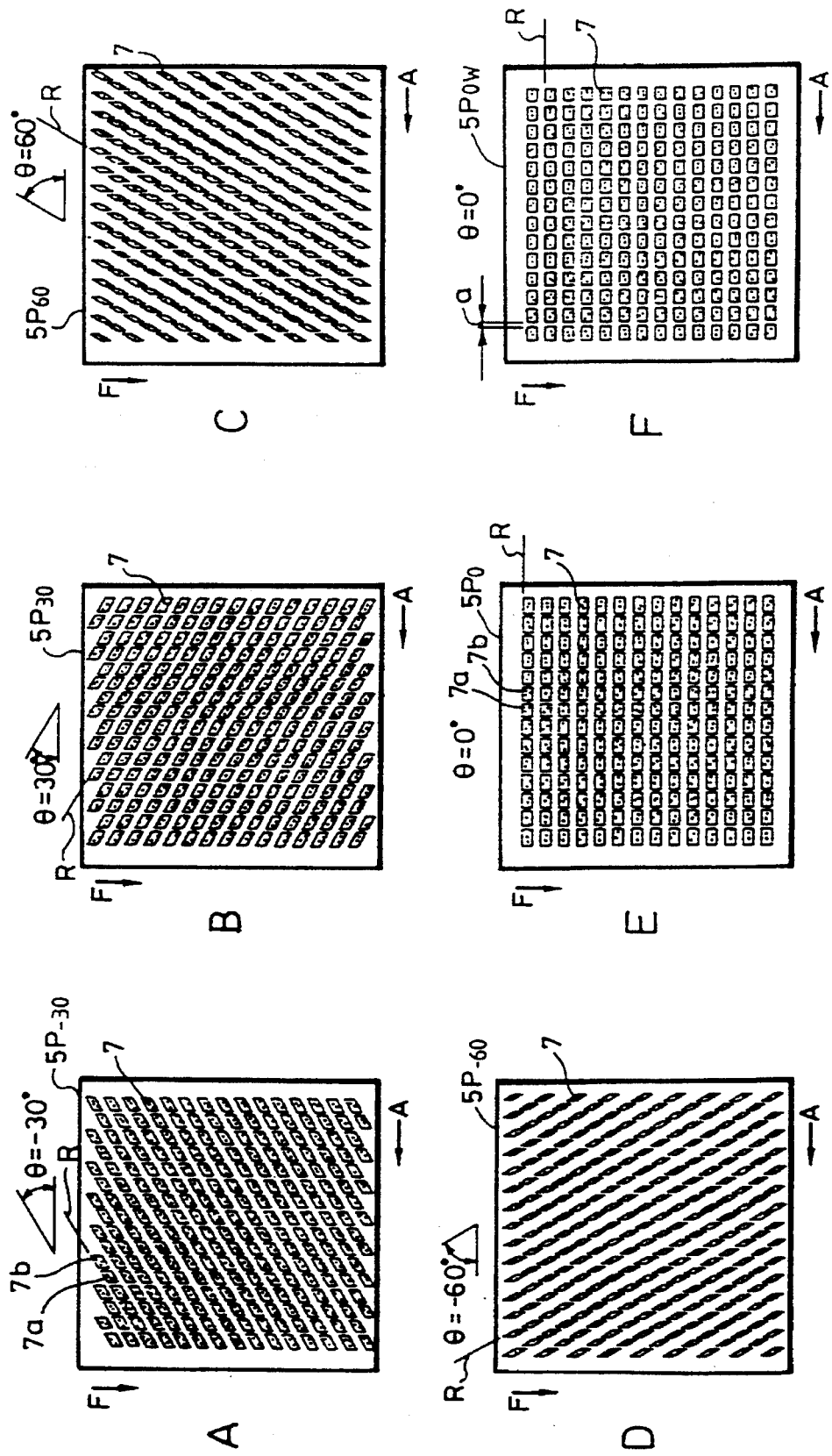
FIG. 10A is a schematic diagram showing one example of a dot pattern formed on a press plate by prior art technology.
FIG. 10B is a schematic diagram showing another example of a dot pattern formed on the press plate by prior art technology.
FIG. 10C is a schematic diagram showing still another example of a dot pattern formed on the press plate by prior art technology.
FIG. 10D is a schematic diagram showing still another example of a dot pattern formed on the press plate by prior art technology.
FIG. 10E is a schematic diagram showing still another example of a dot pattern formed on the press plate by prior art technology.
FIG. 10F is a schematic diagram showing still another example of a dot pattern formed on the press plate by prior art technology.

Here, it is assumed that the semiconductor laser 1 constituting the laser block 4A is, from the beginning, mounted and fixed to be tilted by an angle $\theta = 40°$ relative to the form plate sheet 5 in the sub scanning direction A, as shown in FIG. 5B. The fundamental recess 7D of the embodiment has a length dH, dH=66.7 μmm and a width dV, dV=1 μmm. Therefore, in the case of the fundamental recess 7E in FIG. 5B, its length dHA in the sub scanning direction A becomes dHA=66.7×COS40°=51.1 μmm. A length dVA in the main scanning direction F becomes dVA=66.7×SIN40°=42.9 μmm. FIGS. 6A and 6B show a part of dot pattern formed on the press plate 5P manufactured by the laser plate making apparatus of the example of FIG. 1 (FIG. 2) in which the semiconductor laser 1 is fixed so as to form the fundamental recess 7E having an irradiation angle of $\theta = 40°$.

In the press plate 5Pa in FIG. 6A, the irradiation angle $\theta$ of the laser beam is set to $\theta = 40°$, a distance Fw between recesses (distance corresponding to the plate making distance D in FIG. 3) in the main scanning direction F is set to Fw=64.5 μmm, a distance Aw between recesses in the sub scanning direction A is set to Aw=56 μmm, and an amount of shift Fs of the start position in the main scanning direction between recesses 7a, 7b adjacent to each other in the sub scanning direction A is set to Fs=32.25 μmm. In this case, a printed material produced by the press plate 5Pa contains line components of 30° most intensively. On the other hand, in the press plate 5Pb in FIG. 6B, the irradiation angle $\theta$ of the laser beam is set to $\theta = 40°$, a distance Fw between recesses in the main scanning direction F is set to Fw=53.5 μmm, a distance Aw between recesses in the sub scanning direction A is also set to Aw=53.5 μmm, and an amount of shift Fs of the start position in the main scanning direction between recesses 7a, 7b adjacent to each other in the sub scanning direction A is also set to Fs=53.5 μmm. In addition, as will be understood from the same figure, a value of the pulse number of the reference pulse Pr which is set to the above plate making start position set register, though not shown, constituting the plate making position detecting circuit 61 (see FIG. 1) is identical for both the line of the recesses 7 of the even numbered series and a line of the recesses 7 of the odd numbered series. In other words, the plate making for the line of the recesses 7 of the even numbered series and the line of the recesses 7 of the odd numbered series, is started at the same position in the main scanning direction F. In this case, a printed material produced by the press plate 5Pb contains line components of 45° most intensively.

Since a binary color printed material printed by the press plates 5Pa, 5Pb having two kinds of dot patterns shown in FIGS. 6A and FIG. 6B have difference in angle 15° in the most intensively contained line components, there can be produced a printed material in which Moiré of a certain level is reduced.

Thus, according to the plate making apparatus of the example in FIG. 1 capable of producing the press plates 5Pa, 5Pb in FIG. 6A and FIG. 6B, when the press plate 5Pb (FIG. 6B) is manufactured for a different color relative to the press plate 5Pa (FIG. 6A) for a predetermined color by using a new form plate sheet 5, the irradiation position of the laser beam, or the shifting amount Fs of the start position in the main scanning direction is controlled while the irradiation angle $\theta = 40°$ of the laser beam relative to the form plate sheet 5 is fixed, so as to make the press plate 5Pb on which the dot pattern as a countermeasure against Moiré is formed. Therefore, there can be obtained an effect that the dot pattern as a countermeasure against Moiré can be formed without changing the irradiation angle θ of the laser beam.

For further explanation, in the press plates 5Pa, 5Pb of the embodiment, the slant line R1 formed of the starting position of the formed arbitrary recess 7 in the main scanning direction F is made not to be coincident with the slant line R2 formed of the starting position in the main scanning direction F of a recess 7 located at the next position in the sub scanning direction A, and in addition, the line R3 connecting a predetermined point within the arbitrary recess 7 to a point located at a position corresponding to the predetermined point in the recess 7 which is located at next position in the sub scanning direction A, is set to a constant angle φ different from the irradiation angle θ of the laser beam. Thus, the Moiré is reduced.

FIG. 6C and FIG. 6D shows dot patterns on the press plate 5P made by another laser plate making apparatus in which the irradiation angle is rotated about the optical axis of the laser block 4A as the center by an irradiation angle θ=−40°.

A dot arrangement in FIG. 6C corresponds to that in FIG. 6A, and a dot arrangement in FIG. 6D corresponds to that in FIG. 6B. Therefore, the most intensively contained components are components at φ=−30° in FIG. 6C, and the most intensively contained components are components at φ=−45° in FIG. 6D. Since the printed material printed with two colors by the press plates 5Pc, 5Pd having these two kinds of dot patterns are different in angle of 15° for the most intensive component of the line component, a printed material in which a certain level of Moiré is reduced can be obtained.

In this case, the dot patterns of the press plates 5Pc, 5Pd in FIGS. 6C, 6D are different from each other by 60° or more in the most intensive line component with respect to the above press plates 5Pa, 5Pb in FIG. 6A, 6B. Therefore, when a four-color print of which includes the colors C,M,Y,K is made by using these press plates 5Pa to 5Pd, there can be obtained an effect that Moiré can be also reduced.

Thus, press plates for a color printing can be formed by two laser plate making apparatus which have the laser blocks 4A fixed so as to have different laser irradiation angles of θ=40° and θ=−40°.

In the example utilizing the press plates 5Pa to 5Pd in FIG. 6A to FIG. 6D, press plates for four colors can be manufactured by the two laser plate making apparatus. However, in order to make the press plates for four colors within a shorter time period, there may be prepared two pairs of laser plate making apparatus each of which has the same laser irradiation angle θ and a different angle φ, that is, four plate making apparatus in total which can form the dot patterns in FIG. 6A to FIG. 6D.

Of course, it is also possible to form press plates for four colors by a single laser plate making apparatus in which the irradiation angle θ can be adjusted to have two angles different from each other by, for example, 180°, or, for example, angle 40° and angle −40°.

It is noted that this invention is not limited to the above embodiment and of course it can take other various constructions without departing from the scope of the invention.

As described above, according to the plate making apparatus of the invention, when a press plate for a different color is manufactured by using a new form plate sheet, the position at which the laser beam is irradiated is controlled while the irradiation angle of the laser beam onto the form plate sheet is fixed, so as to form a dot pattern as a countermeasure against Moiré. Therefore, there can be obtained an effect that a dot pattern as a countermeasure against Moiré can be formed without changing the irradiation angle of the laser beam.

Further, according to the press plate of the invention, the slant line formed of the starting position of the formed arbitrary recess in the main scanning direction is formed so as not to be coincident with the slant line formed of the starting position in the main scanning direction of a recess located at the next position in the sub scanning direction. Therefore, when a multicolor printing is carried out by using the press plates thus formed, manifestation of Moiré is reduced. Particularly, when the line connecting a predetermined point within the arbitrary recess to the point located at the position corresponding to the predetermined point in the recess which is located at next position in the sub scanning direction, is set to a constant angle different from the irradiation angle of the laser beam, there can be achieved an effect that the Moiré is further reduced.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for making a press plate for use in gravure printing, comprising the steps of:

controlling the rotation of a rotating plate cylinder rotatably supported around a rotational axis, a plate sheet being wound around said rotating plate cylinder;

irradiating a laser beam onto said plate sheet to form recesses thereon, said laser beam having a beam spot which is elongated in a predetermined direction, wherein an angle between said predetermined direction and said rotational axis is constant;

controlling said laser beam irradiation in response to input image data as said rotating plate cylinder rotates so that a line image pattern made of said recesses is formed on said plate sheet in the circumferential direction of said rotating plate cylinder according to said input image data; and sequentially shifting the position of said laser beam in the direction of said rotational axis as each line image pattern made of said recesses is complete so that a two-dimensional image pattern made of said recesses is formed on said plate sheet;

further controlling the laser beam irradiation in such a manner that corresponding positions of a series of said recesses located approximately in the direction of said rotational axis form an imaginary line, said imaginary line being not parallel with said predetermined direction so that said two-dimensional image pattern as a whole has a primary line component represented by said imaginary line which is different from a line component represented by said predetermined direction of said beam spot.

2. A method for making a plurality of press plates with each said press plate for a different color in color gravure printing, comprising the steps of:

controlling the rotation of a rotating plate cylinder rotatably supported around a rotational axis, a plate sheet being wound around said rotating plate cylinder;

irradiating a laser beam onto said plate sheet to form recesses thereon, said laser beam having a beam spot which is elongated in a predetermined direction, wherein an angle between said predetermined direction and said rotational axis is constant;

controlling said laser beam irradiation in response to input image data as said rotating plate cylinder rotates so that a line image pattern made of said recesses is formed on said plate sheet in the circumferential direction of said rotating plate cylinder according to said input image data; and sequentially shifting the position of said laser beam in the direction of said rotational axis as each line image pattern made of said recesses is complete so that a two-dimensional image pattern made of said recesses is formed on said plate sheet, further controlling the laser beam irradiation is controlled in such a manner that corresponding positions of a series of said recesses located approximately in the direction of said rotational axis form an imaginary line, said imaginary line being not in parallel with said predetermined direction so that said two-dimensional image pattern as a whole has a primary line component represented by said imaginary line which is different from a line component represented by said predetermined direction of said beam spot, said imaginary line for each of said plate sheets used for different colors being selected not to be parallel with one another so that said two-dimensional image patterns on said plate sheets used for different colors have the primary line components at different angles, whereby color moire effects resulting from color printing using a plurality of said press plates for different colors are inhibited.

3. A method for making a press plate for use in gravure printing, comprising the steps of:

rotating a plate cylinder about an axis of rotation with a plate sheet wound around said rotating plate cylinder;

selectively irradiating said plate sheet with a laser while said plate sheet is on said rotating plate cylinder to form a pattern of recesses on said plate sheet, said recesses being arranged in lines which are normal to said axis of rotation and in rows along a first predetermined angle with respect to said axis of rotation;

forming said recesses in an approximately parallelogram shape having two sides which are normal with said axis of rotation and having two sides which are at a second predetermined angle with respect to said axis of rotation; and wherein said first predetermined angle is not equal to said second predetermined angle.

4. The method according to claim 3, wherein said parallelogram shaped recesses are rhombus shaped.

5. The method according to claim 3, wherein said laser generates a laser beam which is elongated in the direction of said second predetermined angle.

6. The method according to claim 3, wherein a difference between said first angle and said second angle is approximately 5 to 10 degrees.

7. The method according to claim 3, wherein said second predetermined angle ranges from approximately −40 degrees to approximately +40 degrees.

8. A gravure press plate for use in gravure printing, comprising:

a plurality of rows each comprising a plurality of recesses so that a two-dimensional image pattern of said recesses is formed on said press plate, each said recess having an approximately parallelogram shape defined by first and second sets of sides and each representing a pixel of an image, said rows being arranged in parallel with said first set of sides;

wherein corresponding positions of a series of said recesses located approximately in the direction perpendicular to said rows are aligned along an imaginary line which is not in parallel with said second set of sides so that said two-dimensional image pattern as a whole has a primary line component represented by said imaginary line which is different from a line component represented by said second set of sides of said recesses.

9. The gravure press plate according to claim 8, wherein said recesses are rhombus shaped.

10. A set of plural gravure press plates used for different colors in gravure printing, each press plate comprising:

a plurality of rows each comprising a plurality of recesses so that a two-dimensional pattern of said recesses is formed on each said press plate, each said recesses having an approximately parallelogram shape defined by first and second sets of sides and each representing a pixel of an image, said rows being arranged in parallel with said first set of sides;

wherein corresponding positions of a series of said recesses located approximately in the direction perpendicular to said rows form an imaginary line which is not in parallel with said second set of sides so that said two-dimensional image pattern as a whole has a primary line component represented by said imaginary line which is different from a line component represented by said second set of sides of said recesses, said imaginary line of each said press plate being not in parallel with one another so that the primary line components of said two-dimensional image patterns as a whole on said press plates used for different colors are at different angles, whereby color moire effects resulting from color printing using said press plates for different colors are inhibited.

11. The set of plural gravure press plates according to claim 10, wherein said recesses are rhombus shaped.

* * * * *